UNITED STATES PATENT OFFICE.

STANLEY C. C. CURRIE, OF NEW YORK, N. Y., ASSIGNOR OF ONE-FOURTH TO WILLIAM COURTENAY, OF NEW YORK, N. Y.

METHOD OF REDUCING ORES.

SPECIFICATION forming part of Letters Patent No. 718,099, dated January 13, 1903.

Application filed August 23, 1901. Serial No. 73,090. (No specimens.)

*To all whom it may concern:*

Be it known that I, STANLEY C. C. CURRIE, residing at New York, in the county of New York and State of New York, have invented certain new and useful Impovements in Methods of Reducing Ores, of which the following is a specification.

This invention relates to a method of treating ores and ore concentrates of precious metals.

The object of the invention is the elimination from the ores or concentrates of certain undesirable baser metals or salts thereof previous to the final treatment for reduction or extraction of the precious metals from said ores or concentrates.

The process particularly applies to the treatment of auriferous ores containing sulfur in combination with metals—such as iron, copper, lead, zinc, arsenic, antimony, &c.—commonly known as "sulfurets." It is a well-known fact that under present methods of roasting sulfurets (containing such metals as above mentioned) in many cases a very considerable loss of precious metals is effected as result of volatilization, especially with such metals as arsenic, antimony, zinc, &c. Furthermore, whereas certain metallic oxids produced as result of roasting, especially at high temperatures, are not acted upon, and therefore do not effect loss of chemicals used in the solvent solution required for the extraction of the [precious metals, on the other hand other oxids of metals may be produced which are very deleterious. For example, in the case of chlorination of roasted ores chlorin has little or no effect upon certain oxids of iron, provided no acid be present, whereas in the case of copper and other metals which are readily attacked by chlorin considerable loss of some may be produced during lixiviation. The same applies to cyanid solution in which oxids of certain metals are not readily attacked. It is a fact that by a careful regulation of the temperature in the furnaces as now used for roasting ores certain sulfids may be reduced to sulfates soluble in water and by use of salt into soluble chlorids—such, for instance, as copper clorid. On the other hand, other sulfates even if formed are not soluble in water, such as lead sulfate. In any case with the present method of roasting it is practically impossible to regulate the temperature and exactly adjust the same so that the oxidation of the sulfids may be arrested at any particular stage or degree of heat and at the same time avoid the volatilization of the volatile metals and the salts of the same.

Now this invention consists in the following general divisions: first, the regulation and adjustment of heat in the presence of air or steam or combination of both as applied to the oxidation of metallic sulfids, (or other oxidizable salts of metals,) so that they may be severally reduced to soluble salts and washed out when in such form by water or solutions in which they may be severally soluble; second, the elimination by this method of the volatile metals and salts of the same previous to the application of a higher temperature to the ore, (thus previously treated,) whereby the remaining metals or metallic salts may be suitably oxidized and ready for lixiviation for extraction of the precious metals under most favorable, efficient, and economical conditions.

As a practical example of the process I take a pyrite concentrate containing, in addition to gold and silver, say, iron, copper, lead, zinc, antimony, arsenic, &c., in form of sulfids. I first subject the finely-divided ore, preferably in a closed vessel, to an application of hot air and steam, either separately or together, at such temperatures and in such combinations as may be best suited to rapidly and efficiently attain the desired object—namely, the reduction of the sulfids or some of them (without loss by volatilization) to lower sulfids or sulfates. Upon attaining said result I turn off the hot air and steam and subject the ore to a washing with water, either hot or cold. In case of ore, as above mentioned, any sulfates of iron or copper would be washed out at this stage. I then, if necessary, repeat the foregoing—that is, I again apply the hot air or steam, or both, at a regulated temperature, preferably higher than in the first instance—or I may, directly after washing with water, apply a solution of hot caustic soda or potash, preferably the latter. The object of this caustic solution is to wash out sulfate of lead and the salts of arsenic, antimony, &c., in fact to remove all such metals or salts of same as may be soluble in the hot alkaline solution. After applying this solution for a sufficient time I run the same off and again wash with water. I then again apply hot air or steam, or both, or I may subject the resultant ore at this stage to a roast in any suitable furnace, provided, of course, that the volatile metals or salts of the same have been previously sufficiently eliminated, as above described. Thus the various stages are as follows, either before or after roasting at a lower temperature to drive off volatile matter: subjecting the sulfurets to an application of hot air or steam, or both, at regulated temperatures for the purpose of reducing insoluble sulfids to soluble salts; washing with water for the purpose of eliminating such salts as may be soluble in water, (repeat the operation if necessary;) washing with hot caustic alkali for the purpose of eliminating such salts as may be soluble in the same; final heating by hot air or steam, or both, or roasting; lixiviation with solution for purpose of extracting precious metals, the last step being in itself a common step.

It will be noted that a very important feature of the process is that of controlling and regulating the temperature of the air and steam or combination thereof, also controlling and regulating the proportional combinations of the same, so as to obtain the desired results.

A further important feature is the application of the hot caustic alkali at such stage of the process as it may be most effective in dissolving out the several metallic salts soluble in same.

Another important feature is the use of hot air and steam (the temperatures of which are adjusted previous to application to the ore) at such stages of the process as may be of special service for either reducing sulfids or producing oxids. The hot air or steam, or both, are hot gaseous compounds containing oxygen.

A further important feature is the extraction of the lead either in form of sulfate or oxid by hot caustic-alkali solution.

In cases where the ore contains little or no easily-volatilizable metallic salts the ore can be previously roasted by any ordinary method until some of the resultant metallic salts are in such forms as may be soluble in hot caustic alkali, and, furthermore, in cases where metals are present which are capable of being volatilized at comparatively low temperatures the ore may be at first subjected to a roast at low temperature previous to the application of hot air or steam and of course previous to the application of the hot caustic-alkaline solution. Inasmuch as ores vary in many particulars, it is impossible to give accurate formula as to the temperatures of the air and steam or the quantity of caustic alkali which can be used to best advantage in any particular instance. The theory of my invention is to attack and remove the more easily soluble substances at the earlier stages of the process, and thus leave a smaller quantity of material for subsequent treatment; also, that stubborn ores may often be reduced by repeated attacks from a mild reducing agent, which might resist a single attack of any agent.

While the mechanism by which the process is carried out forms no part of the present application, it is evident that steam can be supplied to the ores from any ordinary steam-boiler and hot air or other hot gas from any convenient source of supply. A convenient arrangement is to place a heating-coil inside the furnace of the steam-boiler and force air by a pressure-pump through this coil and so to the ore-receptacle. Then by suitable valves either hot air or steam, or both, can be introduced into the receptacle containing the ores. The relative quantity of the steam or gas or air used can be easily regulated by whoever controls the valves.

I do not herein specifically claim the step in the art of reducing ores which consists in subjecting the ore before final roasting and unmixed with extraneous materials to the action of unmixed steam, nor the same with a subsequent step of washing the ore with water, nor the same with the subsequent step of treatment by hot caustic alkali, the Commissioner of Patents having decided that such steps constitute a distinct invention not patentable in this application. I do not intend, however, to abandon my rights as the inventor of such subprocesses.

What I claim is—

1. The step in the art of treating pulverized ores containing precious metals, which consists in subjecting the ore, in a closed vessel, to the action of hot air at a temperature which reduces some of the salts in the ore from an insoluble to a soluble condition in water, then washing away the soluble salts with water and then repeating the step with air at a higher temperature.

2. The step in the art of treating pulverized ores containing precious metals and other substances, which consists in subjecting the ore in a closed vessel to the action of hot air and steam at temperatures which reduce some of the salts from insoluble to soluble condition in water then washing away the soluble matter with water, then repeating the step with air and steam at higher temperatures.

3. The step in the art of treating pulverized ores containing precious metals and other substances, which consists in subjecting the ore to the action of hot air, then washing away the soluble material with water, then subjecting the remainder to a solution of hot caustic alkali.

4. The step in the art of treating pulverized ores containing precious metals and other substances, which consists in subjecting the ore to the action of hot air and steam, then washing away the soluble portion with water, then subjecting the residuum to the action of hot caustic alkali.

5. The method of treating pulverized ores containing precious metals and other substances, which consists in treating the ore with a heated gaseous compound containing oxygen, at temperatures which render some of the normally insoluble salts soluble in water, then washing away the soluble portion with water, then treating the remainder with a hot alkaline solution, then again washing with water.

6. The method of treating pulverized ores containing precious metals and other substances, which consists in subjecting the ore to the action of a hot gaseous compound containing oxygen, at temperatures which render some of the otherwise insoluble salts soluble, then washing away the soluble portions with water, then again treating with a hot gaseous compound containing oxygen, then again washing with water.

7. The method of treating pulverized ores containing precious metals and other substances, which consists in subjecting the ore to the action of a hot gaseous compound containing oxygen, then washing away the soluble portion with water, then again treating the remainder with a hot gaseous compound containing oxygen, then again washing with water, then treating the remainder with hot caustic alkali, then again washing with water.

8. The method of treating pulverized ores containing precious metal and other substances, which consists in subjecting the ore to the action of a hot gaseous compound containing oxygen, then washing with water, then treating the remainder with a hot caustic alkali, then washing with water, then roasting.

9. The method of treating pulverized ores containing precious metal and other substances, which consists in subjecting the ore to the action of a hot gaseous compound containing oxygen, then washing, then treating with a hot caustic alkali, then washing, then roasting, and afterward treating with chemicals in usual manner.

In testimony whereof I affix my signature in presence of two witnesses.

STANLEY C. C. CURRIE.

Witnesses:
GEORGE L. COURTENAY,
BERTRAM C. SMITH.